United States Patent [19]
Panasjuk et al.

[11] 3,913,009
[45] Oct. 14, 1975

[54] METHOD OF INSPECTING POWDER-CORED ELECTRODES AND DEVICE FOR EFFECTING SAID METHOD

[76] Inventors: Vladimir Vasilievich Panasjuk, ulitsa Martovicha, 9, kv. 7; Genrikh Nikolaevich Makarov, ulitsa Stavovaya, 24, kv. 2; Anatoly Yakovlevich Teterko, ulitsa Mayakovskogo, 25, kv. 1; Ivan Vasilievich Kartovsky, ploschad Rozy, Ljuxemburg 6, kv. 4, all of Lvov, U.S.S.R.

[22] Filed: Mar. 12, 1974

[21] Appl. No.: 450,498

[52] U.S. Cl. .............................................. 324/34 R
[51] Int. Cl.² ......................................... G01R 33/12
[58] Field of Search .......... 324/34 R, 34 PE, 34 MC

[56] References Cited
UNITED STATES PATENTS

| | | | |
|---|---|---|---|
| 2,790,950 | 4/1957 | Miller | 324/34 R |
| 3,068,380 | 12/1962 | Lamoreaux | 324/34 MC |

FOREIGN PATENTS OR APPLICATIONS

| | | | |
|---|---|---|---|
| 124,547 | 3/1959 | U.S.S.R. | 324/34 R |

*Primary Examiner*—Robert J. Corcoran
*Attorney, Agent, or Firm*—Waters, Schwartz & Nissen

[57] ABSTRACT

Method and device for inspecting powder-cored electrodes having two components, a casing and a charge therein, for directly checking the filling of the electrodes with the charges in the course of their manufacture.

The method consists in that the electrode is placed in a high-frequency electromagnetic field set up by a current coil, connected to a high-frequency generator, the electrode being concurrently subjected to the effect of a magnetostatic field, set up by a magnetizing coil powdered from a d.c. supply source, and changing the magnitude of the magnetostatic field at least twice during the inspection, whereupon the measuring coil, interacting with the high-frequency magnetic field of the current coil and the magnetic induction of the electrode itself is employed for recording with the help of a measuring circuit, also twice, the variations in the magnetic induction of the high-frequency magnetic field brought about by the powder-cored electrode. Then the records are compared in an adder, with one of the signals being previously changed so as to offset the influence of one of the components, e.g. the charge, of the powder-cored electrode. The weight of the other electrode component, e.g. the casing, can then determined by the difference in the above values.

6 Claims, 12 Drawing Figures

METHOD OF INSPECTING POWDER-CORED ELECTRODES AND DEVICE FOR EFFECTING SAID METHOD

The present invention relates to electromagnetic methods of non-destructive inspection, and more particularly to a method of and devices for inspecting powder-cored electrodes.

The herein-proposed method of inspecting powder-cored electrodes, and devices for accomplishing the above method, are particularly useful for directly checking the filling of electrode casings with charges directly in the course of manufacture on drawing machines. The proposed device makes it possible to inspect powder-cored electrodes containing ferromagnetic materials in their charge.

As for the proposed device, it is also useful for inspecting powder-cored electrodes in carrying out welding operations on critical parts.

In the course of the fabrication of powder-cored electrodes various factors may lead to non-uniform filling of the electrode casings with the charge, this non-uniformity exceeding the permissible limits, and to the occurrence of voids, i.e. of sections in the electrode casing that are not filled with the charge. Welding with such powder-cored electrodes may result in defects in the welded joints, such as pores or cracks.

The use of the proposed method and devices for inspecting the electrodes enable a continuous inspection of the electrodes with the control data being automatically recorded. Inspection charts and diagrams thus obtained allow quality grading of lots of the powder-cored electrodes depending upon the adequacy of filling them with the charge.

Known in the art are various methods of electromagnetic inspection of powder-cored electrodes and similar articles. Thus, in a known procedure the powder-cored electrode is placed in a high-frequency electromagnetic field which results in a change in the magnetic induction of the field. This variation in the magnetic induction is the function of magnetic permeability and powder-cored electrode quantity. However, with the above method of inspection, an error may take place because of variations in the initial permeability of the powder-cored electrode itself. As is commonly known, the initial permeability varies materially along the length of the powder-cored electrode and depends on a number of factors.

To minimize the above error, use is usually made of a method of inspection of powder-cored electrodes, wherein the magnetic properties of the electrodes are stabilized by subjecting them simultaneously to the effect of a high-frequency magnetic field and to a biasing constant magnetic or magnetostatic field.

Also known are devices for effecting the aforesaid inspection methods of electrodes, comprising a high-frequency generator with a current coil connected to it and setting up a variable magnetic field, and a measuring coil interacting with a high-frequency magnetic field and connected in a bridge or a differential measuring circuit. The latter is coupled to the input of an amplifier whose output is connected to the measuring circuit. Also known are similar devices fitted with a magnetizing coil powered from a d.c. supply source to reduce inspection errors.

In inspecting powder-cored electrodes the components that bring about variations in the magnetic induction of the high-frequency magnetic field are the casing and the core materials or the charge, and more exactly — the quantity or weight and the magnetic permeability of these components.

Inherent in the above-described inspection methods and devices is a main disadvantage which consists in that they serve to determine the total quantity of both the charge and the casing in a powder-cored electrode, this being inadequate to estimate the uniformity of filling of the powder-cored electrodes.

Actually for industrial control the possibility of checking, for example, the filling of the electrode with the charge along its length is of prime importance. At the same time the prior-art methods and devices do not allow inspecting the electrode components separately. Therefore in estimating the quantity of charge in the powder-cored electrode it is impossible to take into account an error caused by changes in the quantity of the casing per unit length of the powder-cored electrode and in its magnetic permeability.

Owing to the above, the hereinbefore-described methods of inspecting powder-cored electrodes, and devices for effecting these methods, are suitable only for quality control giving evidence of the presence of the charge in the casing, i.e. for revealing the sections of the powder-cored electrode that are either not filled or only poorly filled with the charge.

The provision of means for an industrial quantitative inspection of the charges in the electrodes, directly in the course of their fabrication, requires a novel engineering solution of the problem.

It is an object of the present invention to overcome the above disadvantages.

Another object of the invention is to provide a method of inspecting powder-cored electrodes having two components, namely casings and powder charges filled therein, and a device for effecting the method, ensuring industrial control of the quantity of the charge or casing component along the length of the powder-cored electrode, directly in the course of manufacture.

These objects are accomplished in the inventive inspecting method, wherein the two-component electrodes are subjected concurrently to the combined effect of a high-frequency field and a magnetostatic field, and variations in magnetic induction of the high-frequency magnetic field, brought about by the powder-cored electrode being inspected, are used for estimating the quantitative composition of the electrode components, in that, according to the invention, the magnitude of the magnetostatic field is changed at least twice during the inspection process, and variations in the magnetic induction of the high-frequency magnetic field, resulting from the introduction of the powder-cored electrode, are recorded for chosen intensities of the constant magnetic field, whereupon a comparison of the obtained records is performed, having previously changed one of the magnitudes so as to offset the effect of one of the components of the electrode, the quantity or weight of the other component being determined by the difference in the two magnitudes.

It is recommended that the quantity of the charge or casing component in the electrode be respectively determined by the difference in the variation magnitudes of the magnetic induction of the high-frequency magnetic field, one of which was previously changed in a preset manner so as to exclude the influence of the casing or charge component, and the quantity or weight of the casing or charge component in the electrode can be respectively estimated by the difference in the variation magnitudes of the magnetic induction of the high-frequency magnetic field, one of which is preferably previously changed in a preset manner so as to rule out the effect of the charge or casing component.

The invention also relates to a device for inspecting the two-component powder-cored electrodes, comprising a magnetizing coil powered from a d.c. supply source, a current coil coupled to a high-frequency generator for setting up an alternating high-frequency magnetic field, and a measuring coil interacting with the high-frequency magnetic field of the current coil and cut-in into measuring means whose output is connected to an amplifier connected in series with an output signal measuring channel, all the coils being arranged coaxially with the powder-cored electrode being inspected.

The d.c. supply source has at least two outputs providing direct currents of different values, and switching means for successive connection of the magnetizing coil to the outputs, ensuring a variation in the magnetostatic field magnitude, the amplifier output being provided with an additional independent output signal measuring channel.

Each measuring channel is fitted with a peak detector connected successively and synchronously with the variation in the field magnitude by the switching means to the amplifier output, so that one measuring channel is adapted for measuring the variation magnitude of the magnetic induction of the high-frequency magnetic field, corresponding to a certain magnitude of the magnetostatic field, while the other channel is for measuring the output signal corresponding to another magnitude of the magnetic field. The outputs of the two channels are coupled to the inputs of an adder which compares the input signals, one of which has been previously changed in a preset manner so as to exclude the influence of one of the electrode components, and to ensure weight measurement of the other component thereof.

Moreover, it is suggested that the switching means include a low-frequency generator connected in series to a repetition-frequency doubler with a controlled on-off time ratio, and having six electronic keys or switches. The first, second, third and fourth of these are controlled by the low-frequency generator, and the fifth and sixth switches by the frequency doubler. The first and second keys or switches are used for coupling the magnetizing coil to the outputs of the d.c. supply source, while two pairs of the switches — the third and the fifth, with the fourth with the sixth — are connected in series and inserted between the amplifier outputs and the respective inputs of the measuring channels, the measurement being thus performed within a period of stable magnitudes of the magnetostatic field.

In addition, the inventive device may also comprise the magnetizing coil powered from the d.c. supply source, current coils connected to the high-frequency generator for setting up an alternating high-frequency magnetic field, and measuring coils respectively interacting with the high-frequency magnetic field, inserted into measuring circuits or means whose outputs are connected to the amplifiers. All coils are mounted coaxially with the powder-cored electrode, and each amplifier is coupled to a detector, whose outputs are connected to the The invention also contemplates the magnetizing coil with a variable winding profile for setting up a magnetic field whose intensity varies along the axis of the magnetizing coil so that at least two sections are formed with different intensities of the magnetostatic field.

The high-frequency current and magnetizing coils are preferably arranged in pairs within each section. To obtain a difference signal at the adder output, one of the signals fed from the measuring coils to the adder output being previously changed in a preset manner so as to exclude the effect of one of the electrode components, a feature which makes it possible to measure the quantity or weight of the other electrode component.

The proposed inspecting method and the device therefore ensure continuous checking of the filling of the powder-cored electrodes with the charges, directly in the course of their fabrication. As a result, voids and sections inadequately filled with the charge can be revealed, with the records being appropriately entered and the powder-cored electrodes marked.

Grading of the powder-cored electrodes in accordance with the above-disclosed method makes it possible to guarantee adequate charge fillings.

The use of the proposed method of inspecting the powder-cored electrodes enhances the quality of welding with such electrodes when using both automatic and semi-automatic welding machines.

Moreover, the herein-proposed inspection method and devices are capable of providing sufficient accuracy in checking the weight of the charge in each electrode in the course of its manufacture, by which virtue they can be employed as monitoring means for developing an automatic control system of the charge feed from a hopper, and for improving powder-cored electrode drawing techniques.

The invention is further exemplified by a detailed description of exemplary embodiments to be had in conjunction with the accompanying drawings, wherein.

The herein-proposed method of inspecting powder-cored electrodes consists in the following. A powder-cored electrode 1 (FIG. 1) is placed in a high-frequency electromagnetic field set up by a current coil 2 connected to a high-frequency generator 3. At the same time the powder-cored electrode 1 is subjected to the effect of a constant magnetic field set up with the aid of a magnetizing coil 4 which is powered from a controlled d.c. supply source 5.

Figure 1:
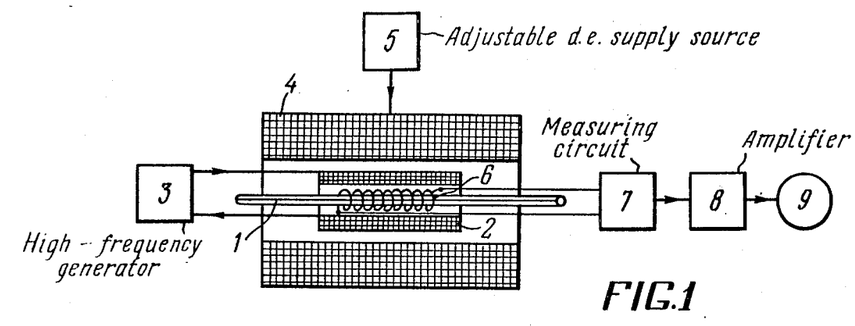
FIG. 1 is a block diagram of a device for inspecting powder-cored electrodes, illustrating the inventive method.

In the course of inspection performed with the help of an inductance measuring coil 6 which interacts with the high-frequency magnetic field set up by the current coil 2 and with magnetic induction of the powder-cored electrode 1, variations in the magnetic induction of the high-frequency magnetic field, brought about by the powder-cored electrode 1, are measured by a measuring circuit 7. The electrical signal resulting at the output of the measuring circuit 7 can be described by the following equation:

$$U(P_1, P_2) = f(P_1, P_2), \quad (1)$$

where $P_1$ —weight of the charge in the powder-cored electrode;

$P_2$ —weight of the casing in the same powder-cored electrode.

For carrying out the above measurements the measuring circuit 7 is previously adjusted so that, with the absence of the powder-cored electrode 1 in the measuring coil 6, its output signal is zero.

Further on, the output signal of the measuring circuit 7 is amplified by a d.c. amplifier 8 and reproduced by an indicator 9.

Variations in the magnetic induction of the high-frequency magnetic field depend on the quantity or weight of the casing materials and the ferromagnetic charge components in the powder-cored electrode 1 and on the extent of their magnetization. It should be noted that only some of the charge components are ferromagnetic. However, insofar as the charge contains a strictly preset amount of its components, its weight is proportional to the quantity of its ferromagnetic constituents. In view of the above-stated, variations in the magnetic induction of the high-frequency magnetic field, brought about by the powder-cored electrode, will be determined by the weight of the charge $-P_1$ and that of the casing $-P_2$.

According to the herein-proposed method of inspecting the powder-cored electrodes, variations in the magnetic induction of the high-frequency magnetic field, caused by the powder-cored electrode 1, are measured at different intensities of the constant magnetic field (magnetostatic field). For ascertaining the two parameters of the powder-cored electrode 1 — the quantity or weight of the charge $P_1$ and that of the casing $P_2$ — separately, it is sufficient to perform the above measurements at two intensity values $H_1$ and $H_2$ ($H_1 \neq H_2$) of the constant magnetic field.

Hence, for example, two electrical signals can be obtained at the output of the measuring circuit 7, these signals being described by the following equation:

$$U_1(P_1, P_2) = f_1(P_1, P_2)$$

$$U_2(P_1, P_2) = f_2(P_1, P_2). \quad (2)$$

The above electrical signals are linearly independent from one another, this being a prerequisite for determining the quantity of the charge $P_1$ and that of the casing $P_2$ in accordance with the variations in the magnetic induction of the high-frequency magnetic field, measured at two different intensities $H_1$ and $H_2$ of the constant magnetic field, corresponding to the electrical signals $U_1(P_1, P_2)$ and $U_2(P_1, P_2)$ obtained at the output of the measuring circuit 7.

Actually, when the magnitude of the constant magnetic field changes, the differential magnetic permeability of the casing and the charge contained in the powder-cored electrode 1 vary in a different way so that the electrical signals $U_1(P_1, P_2)$ and $U_2(P_1, P_2)$ are ultimately linearly independent. This can be shown by the following experiment.

Figure 2:
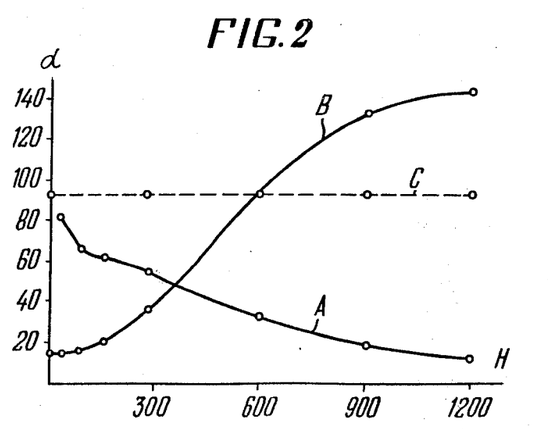
FIG. 2 shows variations in magnetic induction of a high-frequency magnetic field versus a constant biasing field magnitude.

FIG. 2 shows the variations in the magnetic induction of the high-frequency magnetic field (expressed in terms of readings of an indicator 9) versus the intensity H of the constant or magnetostatic field for a specimen of the casing-curve A, and of the charge-curve B. The above dependence curves were obtained as follows. By using a specimen of the powder-cored electrode 1 (FIG. 1) containing the charge, the reading of the indicator 9 proportional to the variation in the magnetic induction of the high-frequency magnetic field is set at $\alpha = 90$ (FIG. 2). Then readings are taken for the specimens of the casing and of the charge for the thus adopted parameters of the measuring circuit 7 and an amplifier 8.

Upon changing the intensity of the constant magnetic field the readings of the indicator 9 are again set at $\alpha = 90$ by making use of a specimen of the powder-cored electrode filled with the charge, which is indicated in FIG. 2 with a dotted line C, whereupon the requisite measurements are taken for the casing and the charge specimens. As shown by the dependence curves in FIG. 2 (curves A and B), as the intensity of the constant magnetic field increases, the influence of the electrode casing diminishes monotonously on variations in the magnetic induction of the high-frequency magnetic field as compared with that of the charge which grows accordingly.

This confirms that the relationships given in Equation (2) are linearly independent. Thus, the intensity of the constant magnetic field can be so selected that the casing and the charge will affect similarly the variations in the magnetic induction of the high-frequency magnetic field or, for example, the effect of the casing will be several times less than that of the charge. It should be noted that the intensities of the constant magnetic field at which the powder-cored electrode is checked should be higher than the intensity of the constant magnetic field needed to stabilize the initial permeability of the electrode casing.

The thus established peculiarity in the variation of the relative influence of the charge and casing on the alteration of the magnetic induction of the high-frequency magnetic field, brought about by the powder-cored electrode owing to a change in the magnitude of the constant magnetic (magnetostatic) field, is attributed to the fact that both the casing and the ferromagnetic charge components feature different demagnetizing factors. This is due to their different shapes, i.e. the casing is equivalent to a long cylinder and the ferromagnetic charge constituents are separated by its nonmagnetic components, being thereby similar to separate particles of a small length as compared to their diametrical dimensions, whose shape in calculations may therefore be assumed as spherical.

Hence, the demagnetizing factor of the ferromagnetic charge components is rather large in comparison with that of the casing. Therefore, when the intensity of the constant magnetic field grows, the casing material approaches a saturation point, while the ferromagnetic components of the charge are still far from that point. Hence, for a large constant biasing field the differential permeability of the charge exceeds that of the casing, the charge effect on variations in the magnetic induction of the high-frequency magnetic field rising whereas that of the casing diminishes. As can be seen from the exemplary experiment with the powder-cored electrode, the above discussed characteristic property is peculiar to composite materials whose elements differ in shape, and can be advantageously used for inspecting such elements by an electromagnetic method.

So, the value $U_2$ proportional to the variation in the magnetic induction of the high-frequency magnetic field, and measured at the intensity $H_2$ of the constant magnetic field, is subtracted from the value $U_1$ proportional to the alteration of the magnetic induction obtained at the intensity $H_1$ of the constant magnetic field, the value $U_2$ being preliminary multiplied by a constant $K_1$. In this case the constant $K_1$ is chosen so that the difference in the above values will not depend on the casing effect. Thus, the following equation is obtained:

$$U_3(P_2) = U_1(P_1, P_2) - K_1 \cdot U_2(P_1, P_2)$$

(3)

Hence, the difference between the magnitudes of variations in the magnetic induction of the high-frequency magnetic field, one of which is previously so changed in the preset ratio ($K_1$) as to exclude the effect of the electrode casing, will be indicative of the quantity of the charge $P_1$ in the powder-cored electrode.

A similar procedure is followed when estimating the quantity or weight of the casisng $P_2$ in the powder-cored electrode. In this case the difference in the magnitudes of variations in the magnetic induction of the high-frequency magnetic field, one of which is previously so changed in another preset ratio ($K_2$) as to exclude the effect of the charge, will give the following equation:

$$U_4(P_1) = U_1(P_1, P_2) - K_2 U_2(P_1, P_2)$$

(4)

The weight of the casing $P_2$ in the powder-cored electrode is thus determined.

The herein-proposed method of inspecting the powder-cored electrodes can be realized with the aid of devices that may have two embodiments. One of the embodiments is expedient to be employed under static control conditions or at low powder-cored electrode drawing rates. This version is not always suitable for use at high drawing rates of about one hundred meters per minute, since difficulties are encountered when it is necessary to increase the switching frequency of a relatively powerful magnetizing system. Therefore, as the drawing rate increases, the accuracy of inspection of the powder-cored electrodes will diminish.

Another possible embodiment of the device is recommended for inspecting the powder-cored electrodes in the course of their manufacture with the drawing rates amounting to hundreds meters per minute.

A first exemplary embodiment of the inventive device for inspecting the powder-cored electrode 1 (FIG. 3) comprises a current coil 2 connected to a high-frequency generator 3 and adapted for setting up a high-frequency electromagnetic field, and a measuring coil 6 interacting with the high-frequency magnetic field induced by the current coil 2, and the magnetizing coil powered from a d.c. supply source 5, these coils being arranged coaxially with the powder-cored electrode 1. The measuring coil 6 is inserted into a measuring circuit or unit 7 whose output is coupled to a d.c. amplifier 8.

Figure 3:
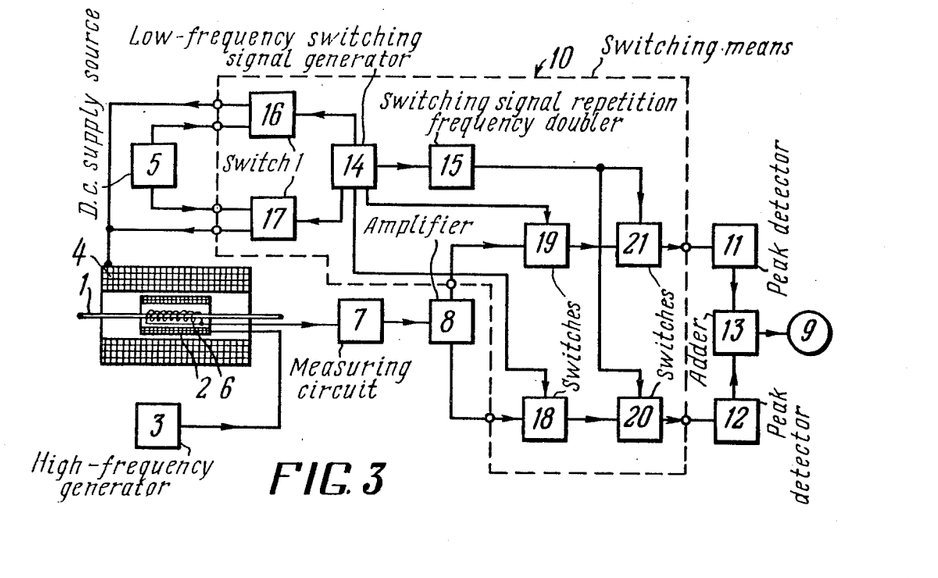
FIG. 3 is a block diagram of a first embodiment of the inventive device for inspecting powder-cored electrodes.

As for the measuring circuit 7, use is made of the known bridge or differential circuits widely employed in devices for checking powder-cored electrodes by the electromagnetic method. The magnetizing coil 4 and the d.c. supply source 5, having two outputs with different amplitudes, are adapted for setting up a constant magnetic field or magnetostatic field featuring different intensities. The magnetizing coil 4 is also mounted coaxially with the powder-cored electrode 1.

For realizing the proposed method of inspecting the powder-cored electrodes 1 it is sufficient to choose the constant magnetic field intensity within 300–1200 oersteds. The intensity of the high-frequency magnetic field does not exceed units or decimal fractions of an oersted, which is usual in electromagnetic inspection, whereas the frequency of the electromagnetic field amounts to tens of kilohertz. The magnetizing coil 4 is coupled to the d.c. supply source through switching means 10 which serves simultaneously for switching the measuring channels of the amplifier 8.

The amplifier 8 has two independent measuring channels, provided with a respective peak detector 11 and 12. The outputs of the peak detectors 11 and 12 are connected to an adder 13. The adder 13 is concurrently used for changing the values of the signals coming from the peak detectors 11 and 12 in a preset ratio $K_1$ or $K_2$ which is chosen in such a manner as to rule out either the effect of the casing or that of the charge on the results obtained. Connected to the output of the adder 13 is an indicator 9.

The switching means 10 comprises a low-frequency switching signal generator 14 connected in series with a switching signal repetition frequency doubler 15 with a controlled duty ratio or adjustable on-off time. Coupled to the output of the low-frequency switching signal generator 14 and switching signal repetition frequency doubler 15 are electronic keys or switches 16 through 21. The keys 16 and 17 are also connected to the outputs of the d.c. supply source 5 and to the input of the magnetizing coil 4. The keys 19 and 21 and the keys 18 and 20 are connected in series and inserted into the measuring channels of the amplifier 8 between its outputs and the corresponding peak detectors 11 and 12. The switches 18 and 19 are coupled to the low-frequency switching signal generator 14 and the keys 20 and 21 to the switching signal repetition frequency doubler 15.

The above-described connection of the circuits provides the coupling of the peak detectors 11 and 12 at the moments of stable magnitudes of the constant mangetostatic field.

The device for effecting the herein-proposed method of inspecting the powder-cored electrodes operates in the following manner. The powder-cored electrode 1 is placed in the high-frequency electromagentic field of the current coil 2 and in the magnetostatic field acting concurrently therewith and set up by the magnetizing coil 4. Variations in the magnetic induction of the high-frequency magnetic field brought about by the powder-cored electrode 1 are measured with the help of the measuring coil 6 inserted into the measuring circuit 7. To this end the measuring circuit 7 is previously adjusted, with the high-frequency generator 3 and d.c. supply source 5 switched on, so as to provide a zero output signal with the absence of the powder-cored electrode 1 in the measuring coil 6.

In the course of inspection the magnetizing coil 4 is connected to two outputs of the d.c. supply source 5 with different amplitudes, providing thereby the requisite variations in the intensity of the magnetic field. The connection is performed by the switches 16 and 17 operating alternately at a frequency which is set by the low-frequency switching signal generator 14 and amounts to tens of hertz.

Figure 4:
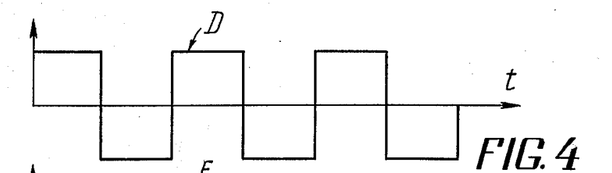
FIG. 4 depicts a time diagram showing voltage variations of a low-frequency switching signal generator.

The low-frequency switching signal generator 14 produces square-topped voltage pulses (time diagram D in FIG. 4) and closes the keys 16 and 17 (FIG. 3) for equal periods of time.

Figure 5:
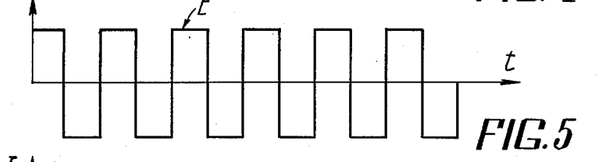
FIG. 5 shows a time diagram of voltage variations of a switching signal repetition frequency doubler.

Synchronously with the switching over of the constant magnetic field the keys or switches 18 and 19, controlled also by the low-frequency switching signal generator 14, successively connect the d.c. amplifier measuring channels, provided with the peak detectors 12 and 11, to the d.c. amplifier 8. However, the measuring channel is eventually coupled to the peak detectors 12 and 11 by the keys 20 and 21 respectively, the latter being controlled by the switching signal repetition frequency doubler 15. The doubler 15 produces square-topped voltage pulses (time diagram E in FIG. 5) from the voltage of the switching signal low-frequency generator 14, the period of the square-topped voltage pulses being one half of the generator voltage.

Figure 6:
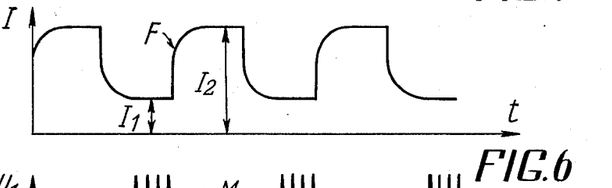
FIG. 6 shows a time diagram of current variations of a magnetizing coil with time.

The switches 20 and 21 are closed for a period of time within which the magnetizing current and accordingly the constant magnetic field intensity will reach the stable values $I_1$ and $I_2$ (time diagram F in FIG. 6). To this end provision is made for adjusting the duty ratio or on-off time of the square-topped voltage pulses prodced by the switching signal repetition frequency doubler 15.

Suppose then that the keys 17 and 19 (FIG. 3) are opened by positive half-periods of the square-wave voltage (time diagram D in FIG. 4) of the switching signal low-frequency generator 14 and the switches 16 and 18 by the negative half-periods of this voltage. Then the current in the magnetizing coil 4 will reach the stable values $I_1$ and $I_2$ some time after the corresponding key or switch 16 or 17 is closed.

Figures 7, 8:
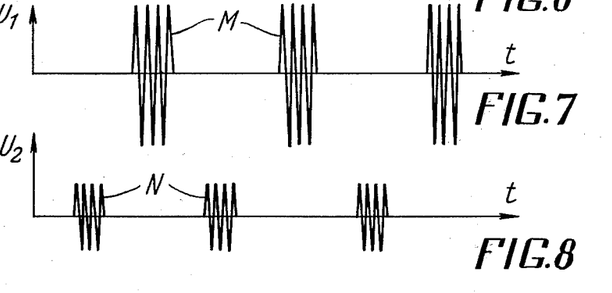
FIG. 7 is a time diagram of a signal being fed to a peak detector input in a first channel.
FIG. 8 is a time diagram of a similar signal in a second channel.

Hence, a variable signal $U_1$ ($P_1$, $P_2$) (time diagram M in FIG. 7) is periodically produced at the output of the peak detector 12, the signal coming from the d.c. amplifier 8 and being proportional to the variation in the magnetic induction of the high-frequency magnetic field set up at the intensity $H_1$ of the constant magnetic field, and corresponding to the magnetizing current $I_1$.

Similarly, a variable signal $U_2$ ($P_2$, $P_1$) will be periodically produced at the output of the peak detector 11 (time diagram N in FIG. 8), the signal coming from the d.c. amplifier 8 (FIG. 3) and being proportional to the variation in the magnetic induction of the high-frequency magnetic field set up at the intensity $H_2$ of the constant magnetic (magnetostatic) field and corresponding to the magnetizing current $I_2$.

Constant voltages proportional to the signals $U_2$ ($P_1$,$P_2$) and $U_1$ ($P_1$, $P_2$) will be fed from the outputs of the peak detectors 11 and 12 to the inputs of the adder 13 where they are compared, and their difference is shown with the help of the indicator 9. The quantity of the components of the powder-cored electrode 1 is determined by the difference signal at the output of the adder 13. In this case the quantity or weight of the charge in the powder-cored electrode 1 is estimated from the difference between the variations in the magnetic induction of the high-frequency magnetic field, one of which has been changed in a preset constant ratio by adjusting the constant $K_1$ to suit the corresponding input of the adder 13.

For this purpose, before the inspection is initiated (upon adjusting the measuring circuit 7 for a zero output signal to be obtained in the absence of the powder-cored electrode 1 in the measuring coil 6), a standard casing specimen of the powder-cored electrode 1 is placed into the measuring coil 6 and the constant $K_1$ is adjusted to suit the corresponding input of the adder 13 so that its output signal will be equal to zero. This will offset the influence of the electrode casing when measuring the quantity of the charge in the powder-cored electrode 1. The standard casing specimen is produced from the electrode of the type to be inspected by completely removing the charge from the specimen.

The quantity of the casing in the powder-cored electrode 1 is estimated by the difference between the variations in the magnetic induction of the high-frequency magnetic field, one of which has been changed in another preset constant ratio by adjusting the constant $K_2$ to suit the corresponding input of the adder 13. Similarly to the above stated, before the inspection is initiated, the influence of the charge is offset by making use of a specimen of the charge employed in the powder-cored electrode of a given type.

Considered hereinbelow is another possible exemplary embodiment of the inventive device for effecting the herein-proposed method of inspecting the powder-cored electrodes in the course of their manufacture, with drawing rates amounting to hundreds of meters per minute. In this case the device (FIG. 9) comprises measuring coils 22' and 22'', current coils 23' and 23'' and a magnetizing coil 24, said coils being arranged coaxially with the powder-cored electrode 1. The magnetizing coil 24 has a stepped winding profile and is connected to a d.c. supply source 25.

Figure 9:
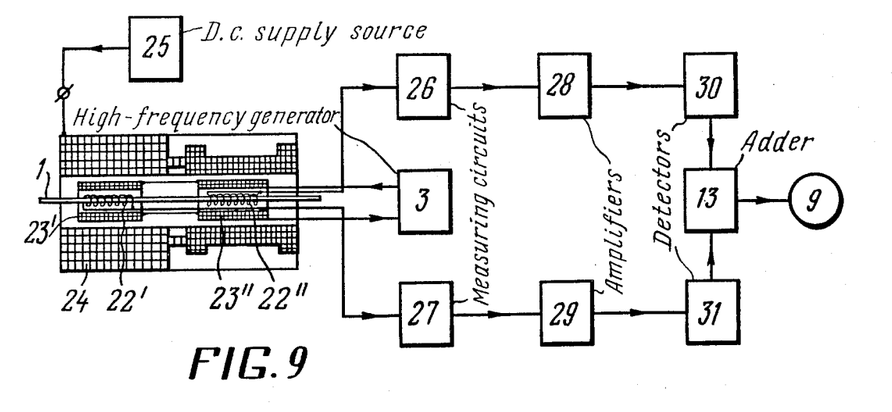
FIG. 9 is a block diagram of a second embodiment of the inventive inspecting device.

Owing to slots and additional windings inherent in the design of the magnetizing coil 24, it is made so that it comprises at least two sections arranged along its axis and featuring different intensities of the magnetostatic field.

Located within the above sections with different intensities of the constant magnetostatic field along the axis of the magnetizing coil 24 are the current coils 23' and 23'' and corresponding measuring coils 22' and 22''. In a general case it is possible to produce several sections with different intensity levels of the magnetic field, increasing accordingly the number of the measuring and current coils. The current coils 23' and 23'' are coupled to the high-frequency generator 3 for setting up a variable magnetic field.

The outputs of measuring channels 26 and 27 are connected to the inputs of corresponding a.c. amplifiers 28 and 29 with a detector 30 cut-in into the output of the amplifier 28 and a detector 31 inserted into the output of the amplifier 29. The outputs of the detectors 30 and 31 are coupled to the inputs of the adder 13 connected to the indicator 9. The device for effecting the above-described method of inspecting the powder-cored electrodes functions as follows.

The powder-cored electrode 1 is placed in the high-frequency electromagnetic field of the current coils 23' and 23" powered from the high-frequency generator 3 and in the magnetic field set up by the magnetizing coil 24.

Figure 10:
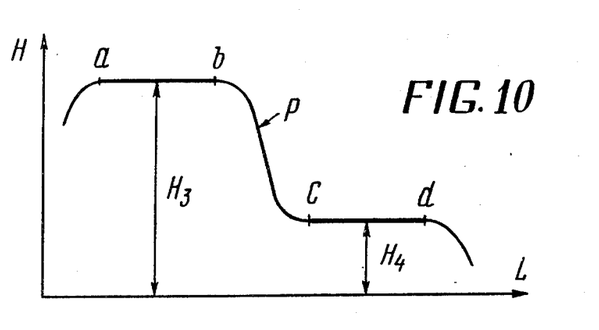
FIG. 10 shows variations in the intensity of the constant magnetostatic field within the magnetizing coil with a variable profile of its winding along the axis of the magnetizing coil.

The intensity H of the magnetostatic field changes along the axis L of the magnetizing coil 24, as is shown in FIG. 10–curve P, and has two sections ab and cd, featuring different intensities $H_3$ and $H_4$.

The value $U_1$ ($P_1$, $P_2$) proportional to the variation, brought about in the magnetic induction of the high-frequency magnetic field at the constant magnetic field intensity $H_3$, is measured with the aid of the measuring coil 22' (FIG. 9) and the measuring channel 27. The value $U_1$ ($P_1$, $P_2$) in the form of an a.c. signal is amplified by the amplifier 29, and on being measured by the detector 31, is fed to the input of the adder 13.

At the same time the measuring coil 22" and the measuring channel 26 measure the value $U_2$ ($P_1$, $P_2$) proportional to the variation in the magnetic induction of the high-frequency magnetic field at the magnetic field intensity $H_4$.

The value $U_2$ ($P_1$, $P_2$) in the form of an a.c. signal is amplified by the amplifier 28, and on being measured by the detector 30, is fed to the second input of the adder 13.

Thus, produced at the output of the adder 13 will be the difference in the input signals one of which is previously changed in a constant preset ratio or manner by using the constants $K_1$ and/or $K_2$. The above difference is indicative of the quantity of either the charge or/and the casing in the powder-cored electordes.

The above ratios are set with the aid of the constants $K_1$ and/or $K_2$ during the initial adjustment of the inventive device. To this end, with the absence of the powder-cored electrode 1 (FIG. 9), the measuring channels 26 and 27 are adjusted so that their output signals are zero. Next a standard casing specimen is placed in the measuring coils 22', and 22" and signal transmission factors in the input channel of the adder 13 are changed so as to provide a zero output signal. This offsets the influence of the casing and provides the requisite obtained with the aid of the constant $K_1$.

Likewise, upon placing a standard charge specimen in the measuring coils 22' and 22", the signals in the input channel of the adder 13 are changed so as to provide a zero output signal. This will make up for the charge influence and provide the requisite ratio obtained with the aid of the constant $K_2$.

As a result of the above-described adjustment of the device, the channels of the adder 13 will be tuned up for checking the quantity of the charge and/or casing in the powder-cored electrode 1.

The thus obtained control data showing the quantity or weight of the charge and/or casing in the powder-cored electrode are then reproduced by the indicator 9.

Figure 11:
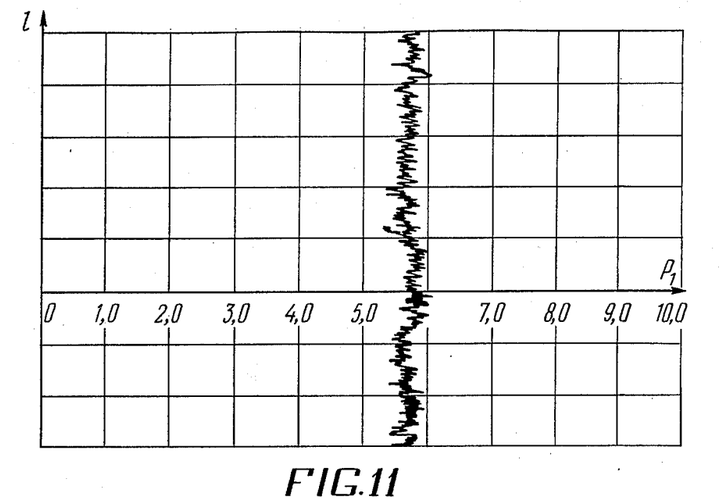
FIG. 11 is a diagram obtained when checking the weight of charge along the length of the powder-cored electrode with the electrode casing normally filled with the charge.
Figure 12:
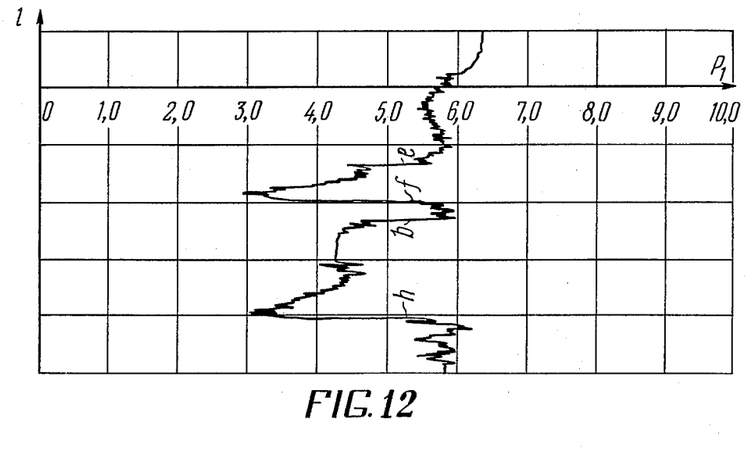
FIG. 12 is a diagram obtained when checking the weight of the charge with individual electrode sections being inadequately filled with the charge.

The diagrams obtained when checking the weight of the charge in the powder-cored electrode along its length 1 are given in FIG. 11 and FIG. 12, the deviation of a recorder in the above diagrams being proportional to the weight of the charge $P_1$ in the powder-cored electrode. The diagram in the FIG. 11 was obtained for a powder-cored electrode normally filled with the charge. Non-uniformity in the filling of the powder-cored electrode was recorded for sections ef and gh in FIG. 12.

What we claim is:

1. A method of inspecting powder-cored electrodes, which are constituted by two components, namely casings filled with powder charges, comprising the steps of: introducing an electrode being inspected simultaneously into, and subjecting the same to, the combined effect of a high-frequency field and a magnetostatic field; changing the magnitude of the latter at least twice during the inspection; recording variations in the magnetic induction of the high-frequency field at the different magnitudes of the magnetostatic field, which variations are brought about by the introduction of the electrode in the field; then comparing the variations of the obtained records, one of the variations having been changed prior to introduction of the electrodes into the magnetizing fields to, thereby offset the influence of one of the two electrode components; and determining the weight of the other electrode component by the difference in the variations.

2. The inspecting method as defined in claim 1, wherein the step of determining the weight of the other electrode component, which is the charge, is based on the difference between variation magnitudes of the magnetic induction of the high-frequency field, measured at two values of the magnetostatic field; including the preliminary step of inserting a standard casing in the magnetizing fields and adjusting the variation differences to zero, thereby excluding the influence of the casing component.

3. The inspecting method as defined in claim 1, wherein the step of determining the weight of the other electrode component, which is the casing, is based on the difference between variation magnitudes of the magnetic induction of the high-frequency field, measured at two values of the magnetostatic field; including the preliminary step of inserting a standard charge in the magnetizing fields and adjusting the variation differences to zero, thereby excluding the influence of the charge component.

4. A device for inspecting powder-cored electrodes, which are constituted by two components, namely casings filled with powder charges, comprising: a d.c. supply source with at least two outputs, providing direct currents of different values; a high-frequency generator producing a high-frequency alternating current; a magnetizing coil arranged coaxially with an electrode being inspected, for producing a magnetostatic field; a current coil also arranged coaxially with the electrode and with said magnetizing coil, and connected to said generator for producing a high-frequency magnetic field; a measuring coil also arranged coaxially with the electrode and with said magnetizing coil, and interacting with the high-frequency magnetic field of said current coil; measuring means connected to said measuring coil, and having an output, for measuring variations in the magnetic induction of the high-frequency magnetic field, caused by insertion of the electrode in said current coil; an amplifier with an input and two outputs, the former being connected to said output of the measuring means; two measuring channels connected for measuring signals at said outputs of the amplifier, said channels having respective inputs, the output signals appearing when the direct current from said source is applied to said magnetizing coil, and the high-frequency alternating current from said generator to said current coil; switching means connected between said magnetizing coil and said d.c. source, providing for the alternate connection of said magnetizing coil to said outputs of the d.c. source, causing the magnitude of the magnetostatic field to change; said switching means also being connected between said amplifier and said measuring channels, providing for switching synchronously with the alternate connection between said magnetizing coil and said d.c. source; said measuring channels being each provided with a peak detector having an output; which peak detectors, as a result of the synchronous switching, provide for measurement of the amplifier output signals proportional to the induction variations of the high-frequency magnetic field, caused by the insertion of the electrode in said current coil; one of said peak detectors providing measurement at one value of the magnetostatic field while the other peak detector provides measurement at another value of the same field; and an adder with inputs connected to said outputs of the peak detectors, providing for comparison of the amplifier output signals, one signal having been changed in a preset manner prior to the introduction of the electrodes into the coils, thereby excluding the influence of one of the two electrode components, and providing for a weight measurement of the other component.

5. The device as defined in claim 4, wherein said switching means includes a switching-signal low-frequency generator connected in series with a switching-signal repetition-frequency doubler having an adjustable on-off time ratio; and six electronic switches, of which the first, second, third and fourth switches are controlled by said low-frequency generator, whereas the fifth and sixth switches are controlled by said frequency doubler; the first and second switches being connected between said magnetizing coil and said outputs of the d.c. source, whereas two pairs of said switches, namely the third with the fifth, and the fourth with the sixth, are connected in series and inserted between said amplifier outputs and respective inputs of said measuring channels, so that the measurement is performed within a period of stable magnitudes of the magnetostatic field.

6. A device for inspecting powder-cored electrodes, which are constituted by two components, namely casings filled with powder charges, comprising: a d.c. supply source; a high-frequency generator producing a high-frequency alternating current; a magnetizing coil powdered from said d.c. source and arranged coaxially with an electrode being inspected; current coils connected to said generator for setting up an alternating high-frequency magnetic field, and also arranged coaxially with the electrode; measuring coils respectively interacting with the high-frequency magnetic field, measuring means whose inputs are coupled to said measuring coils, providing for the measurement of changes in the magnetic induction of the high-frequency magnetic field, caused by the insertion of the electrode in said current coils; amplifiers whose inputs are connected to outputs of said measuring means; detectors connected to outputs of respective amplifiers; and an adder connected to outputs of said detectors, with a difference signal produced at the output of said adder, the signals being applied from said measuring coils, one signal having been changed in a preset manner prior to the introduction of the electrodes into the coils so that the influence of one of the two components of the electrode is minimal; as a result of which the weight of the other electrode component is obtained; said magnetizing coil having a variable diameter in sections of its winding, to set up a magnetic field whose intensity changes along the axis of said magnetizing coil, so that at least two sections are formed, featuring different intensities of the magnetostatic field, with said current and said measuring coils arranged in pairs within each of said sections.

* * * * *